United States Patent
Naduvath et al.

(10) Patent No.: US 12,425,227 B2
(45) Date of Patent: Sep. 23, 2025

(54) QUANTUM SAFE DIGITAL SIGNATURE SERVICE

(71) Applicant: SAP SE, Walldorf (DE)

(72) Inventors: Anitha Naduvath, Bengaluru (IN); Bino Rose Philip, Melbourne (AU); Anselme Tueno, Ettlingen (DE); Andrey Hoursanov, Minsk (DE); Tim Rausch, Karlsruhe (DE); David Boehm, Landau (DE); Ajitha Naduvath, Bengaluru (IN); Mohamed Doula, Destringen (DE)

(73) Assignee: SAP SE, Walldorf (DE)

( * ) Notice: Subject to any disclaimer, the term of this patent is extended or adjusted under 35 U.S.C. 154(b) by 310 days.

(21) Appl. No.: 18/081,225

(22) Filed: Dec. 14, 2022

(65) Prior Publication Data

US 2024/0205018 A1 Jun. 20, 2024

(51) Int. Cl.
*H04L 9/32* (2006.01)
*G06F 16/93* (2019.01)

(52) U.S. Cl.
CPC ............ *H04L 9/3247* (2013.01); *G06F 16/93* (2019.01)

(58) Field of Classification Search
CPC ............................... H04L 9/3247; G06F 16/93
See application file for complete search history.

(56) References Cited

U.S. PATENT DOCUMENTS

| | | | | |
|---|---|---|---|---|
| 6,959,382 | B1* | 10/2005 | Kinnis | H04L 9/3247 713/168 |
| 11,074,305 | B1* | 7/2021 | Ruiz | G06F 16/2448 |
| 2018/0129827 | A1* | 5/2018 | Picazo | G06F 21/64 |
| 2020/0026735 | A1* | 1/2020 | Przada | G06F 16/93 |
| 2023/0254154 | A1* | 8/2023 | Kampanakis | H04L 9/3239 713/189 |
| 2024/0143909 | A1* | 5/2024 | Roberts | G06F 40/205 |
| 2024/0300703 | A1* | 9/2024 | Suto | A61J 1/1406 |
| 2024/0313979 | A1* | 9/2024 | Garcia Morchon | G16B 50/30 |

* cited by examiner

*Primary Examiner* — Han Yang
(74) *Attorney, Agent, or Firm* — Fountainhead Law Group, PC

(57) ABSTRACT

Mechanisms are disclosed for decoupled integration of quantum-safe digital signatures into software applications. Electronic document content is stored, by a software application, in connection with a document store. An application programming interface (API) request is issued to a quantum-safe digital signature service. The API request comprises an identifier associated with the electronic document content and a request to generate a quantum-safe signature associated with the electronic document content. The request to generate a quantum-safe signature of the electronic document content causes the quantum-safe digital signature service to perform several steps. First, the electronic document content is retrieved from the document store. Next, a quantum-safe digital signature data structure is generated. Next, the quantum-safe digital signature data structure is stored to the document store. A signing status update is transmitted to the software application. The software application reads the signature data structure from the document store.

20 Claims, 7 Drawing Sheets

QUANTUM SAFE DIGITAL SIGNATURE SERVICE

TECHNICAL FIELD

Embodiments generally relate to integrating generation and verification of quantum-safe digital signatures into software applications, and more particularly to a decoupled integration into existing software applications of generation and verification of quantum-safe digital signatures.

With the advent of quantum computing, come not only opportunities but also threats to existing trust mechanisms in connection with electronic communication. In the near future, quantum computers will enable decryption of encrypted communications that are currently not susceptible to unauthorized decryption. Once quantum computing based encryption defeating techniques exist, such techniques are likely to become widely available, for example in connection with existing technology such as Quantum Computing as a Service (QCaaS), which promises to make quantum computing generally available. Though QCaaS is presently restricted to scientists, researchers, and industries, soon such services are likely to become available to other quantum enthusiasts as well. Hopeful of using such a service in the near future, attackers are already harvesting encrypted data in order to decrypt this data using the power of the quantum computer at a later time. Hence, users of electronic technologies need certainty that their electronic documents have not been compromised. Therefore, it is very crucial for software providers to ensure the integrity of encrypted electronic communications. Quantum algorithms would make the present day symmetric and asymmetric cryptography (such as public key cryptography) vulnerable. There is a requirement to protect classically encrypted data as current data-encryption techniques will be vulnerable with the availability of quantum computing power. Hence the software industry is strategizing and planning for post-quantum cryptography (PQC). PQC focuses on the development of newer cryptographic techniques, that can be implemented in connection with classical computers and can prevent future potential quantum attacks. PQC aims to develop quantum resistant algorithms that are compatible with a wide range of software and hardware currently in use. Various possibilities of achieving quantum resistance are under consideration, for example using cryptographic techniques such as doubling of key length, focusing on more complex cryptographic techniques like lattice-based cryptography and so on. However, quantum resistant cryptographic techniques have not yet been integrated in existing software applications. Therefore, electronic documents generated in traditional software systems, though digitally signed, may nevertheless be vulnerable to quantum attacks.

Accordingly, what is needed is a mechanism for providing decoupled integration into existing software applications of generation and verification of quantum-safe digital signatures that overcomes the above-described problems and challenges.

SUMMARY

Disclosed embodiments address the above-mentioned problems by providing one or more non-transitory computer-readable media storing computer-executable instructions that, when executed by a processor, perform a method for decoupled integration into existing software applications of generation and verification of quantum-safe digital signatures, the method comprising: storing, by the software application, in connection with a document store, electronic document content, issuing an application programming interface (API) request to a quantum-safe digital signature service, wherein the API request comprises an identifier associated with the electronic document content and a request to generate a quantum-safe signature associated with the electronic document content, and wherein the request to generate a quantum-safe signature of the electronic document content causes the quantum-safe digital signature service to: retrieve the electronic document content from the document store, generate a quantum-safe digital signature data structure, store the quantum-safe digital signature data structure to the document store, and transmit a signing status update to the software application, and reading the signature data structure from the document store.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1A:
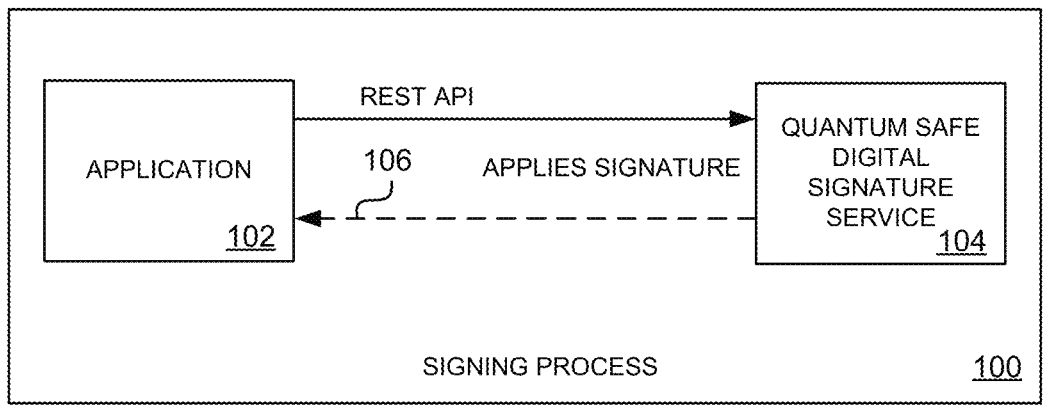
FIGS. 1A and 1B are example system diagrams illustrating providing and verifying quantum-safe digital signatures consistent with the present teachings.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

OVERVIEW

The present teachings describe methods and systems for decoupled integration into existing software applications the generation and verification of quantum-safe digital signatures. The present teachings disclose mechanisms to make encrypted, electronic documents "quantum safe" by applying digital signatures that are quantum resistant. The idea aims at making the digital signatures quantum resistant by using quantum safe cryptography libraries that can run on classical computers. To enable applications of diverse technology platforms to work with quantum resistant digital signatures, it is important that these quantum safe cryptography libraries be usable with a broad set of software platforms and technologies. Consistent with the present teachings, quantum safe techniques may be deployed as microservices on widely adopted software technology platforms. Software applications requiring quantum safe digital signatures can invoke such services via one or more REST API calls.

Usually, cryptography is hard wired into applications, requiring time and effort to adopt a new standard. With the drive from the Internet Engineering Task Force (IETF), the National Institute of Standards and Technology (NIST) and the International Organization of Standardization (ISO), new cryptography is evolving sooner and more often. Hence, a non-invasive and deployment agnostic solution is described herein that is capable of supporting future cryptographic schemes, that adds improved electronic security, and that enables a smooth transition for technology platform providers and their users. Consistent with the present teachings an electronic document is "quantum safe" if it is used in connection with digital signatures that are quantum resistant. The idea aims at making the digital signatures quantum resistant by using quantum safe cryptographic libraries that can run on classical computers.

In some embodiments, a quantum safe digital signature service is invoked via a REST API Post call, by passing the byte stream equivalent of an electronic file to be digitally signed. On receiving a success response along with the new signature file, both the original pdf document as well as the signature file will be stored under attachments of the electronic document. To add the new signature file in a user interface, e.g., under an attachments tab, an existing method may be reused. This may be carried out in connection with existing hooks or exit points so that the quantum safe signatures are essentially transparent to the software application. In some embodiments, an object identifier may be accepted as input and return the status of the verification of the signature file. Such mechanisms may be provided to read attachments corresponding to a quantum safe signature file as well as the original pdf document from existing software layers and then creating a byte stream corresponding to the original electronic file. For this, the code may be reused. A corresponding integration would then make a REST call to the quantum safe digital signature service with both byte streams. The service then verifies results from the REST call and sends the status of the verification, valid/invalid. This is then returned to the user. In some embodiments, widely deployed technology stacks may be extended to be integrated according to the present teachings. In some embodiments the quantum safe digital signature service may be built using Java crypto providers (Bouncy Castle, LibOQS).

Mechanisms consistent with the present teachings have several advantages. Classical digital signatures are not quantum resistant and hence pose security risks to users of classical digital signatures. Quantum safe digital signatures may be consumed in various ways. First, an application may directly invoke a service consistent with the present teachings. The application could belong to a particular software application provider, one or more of the provider's partners, or customers of the provider. The application can decide to use the service in addition to or instead of the existing cryptographic schemes. There could be a variation where an application stores a digital file, or its byte stream equivalent, in a document store, for example a document management system and the service works with the document store. Such an application stores the byte stream equivalent of the file to be digitally signed, in the document store and the service interfaces with the document store.

Another consumption model could be that the application continues to work with the third-party document management solutions to get the document digitally signed, and additionally invoke the service to be quantum safe.

Operational Environment for Embodiments

FIG. 1A is an example system diagram 100 illustrating providing quantum-safe digital signatures consistent with the present teachings. Application 102 transmits an application programming interface (API) request to quantum safe digital signature service 104. In some embodiments, the API request contains contents to sign as well as an instruction to sign the content. Next, quantum safe digital signature service 104 may apply a quantum safe signature to the digital content. In connection with response 106, quantum safe digital signature service 104 transmits an instantiation of a corresponding quantum safe digital signature.

Figure 1B:
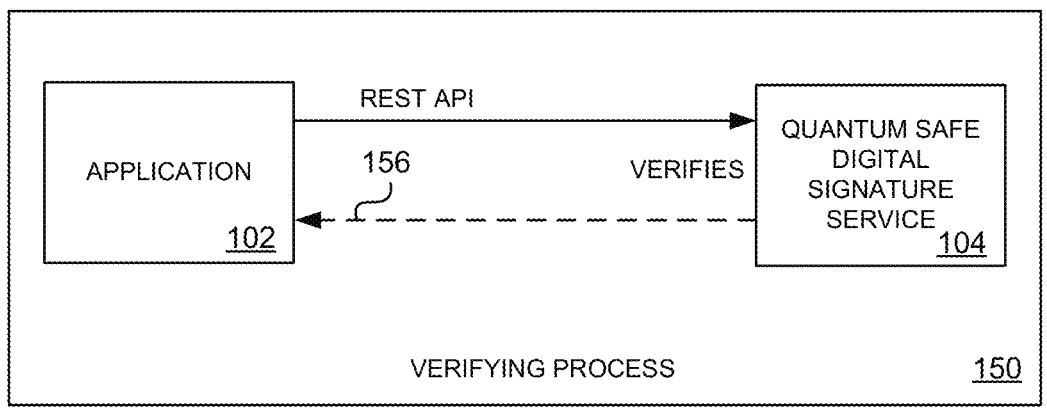

FIG. 1B is another example system diagram 150 illustrating verifying quantum-safe digital signatures consistent with the present teachings. Application 102 transmits an application programming interface (API) request to quantum safe digital signature service 104 to verify a digital signature. In some embodiments, the API request contains a signature, signed contents to verify as well as an instruction to verify the signature in connection with the signed content. Next, quantum safe digital signature service 104 may verify the presented quantum safe signature. In connection with response 156, quantum safe digital signature service 104 transmits a response indicating whether the digital signature is valid.

Figure 2A:
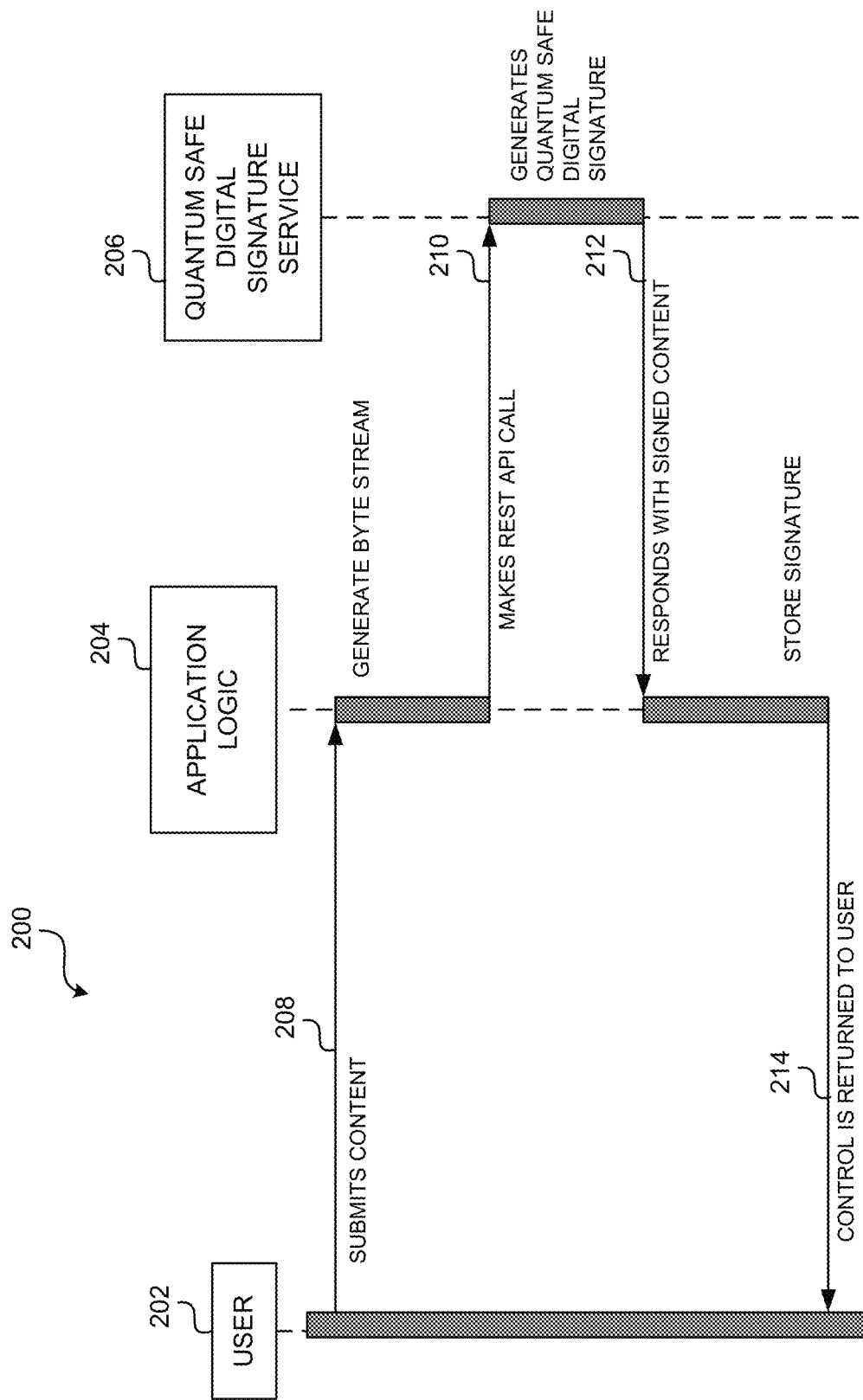
FIGS. 2A-2C are example flow diagrams illustrating example processes for working with quantum-safe digital signatures consistent with the present teachings.

FIG. 2A is an example flow diagram 200 illustrating example processes for working with quantum-safe digital signatures consistent with the present teachings. Flow diagram 200 illustrates generation of a quantum safe digital signature. User 202 may submit content to application logic 204 along transmission 208. As used herein content may be any kind of electronic content such as electronic documents in any electronic document format, such as portable document format (PDF). From here, application logic 204 generates a byte stream corresponding to the electronic content and along transmission 210 sends the byte stream to quantum safe digital signature service 206. Next, quantum safe digital signature service 206 generates a quantum safe digital signature and (along transmission 212) responds with signed content to application logic 204. Next, the signed content is persisted in connection with a software application 204 and control is returned to the user and/or a user device executing software in connection with the running software application, at transmission 214. Next, the signed content is persisted and at transmission 214 the control is returned to the user 202.

Figure 2B:
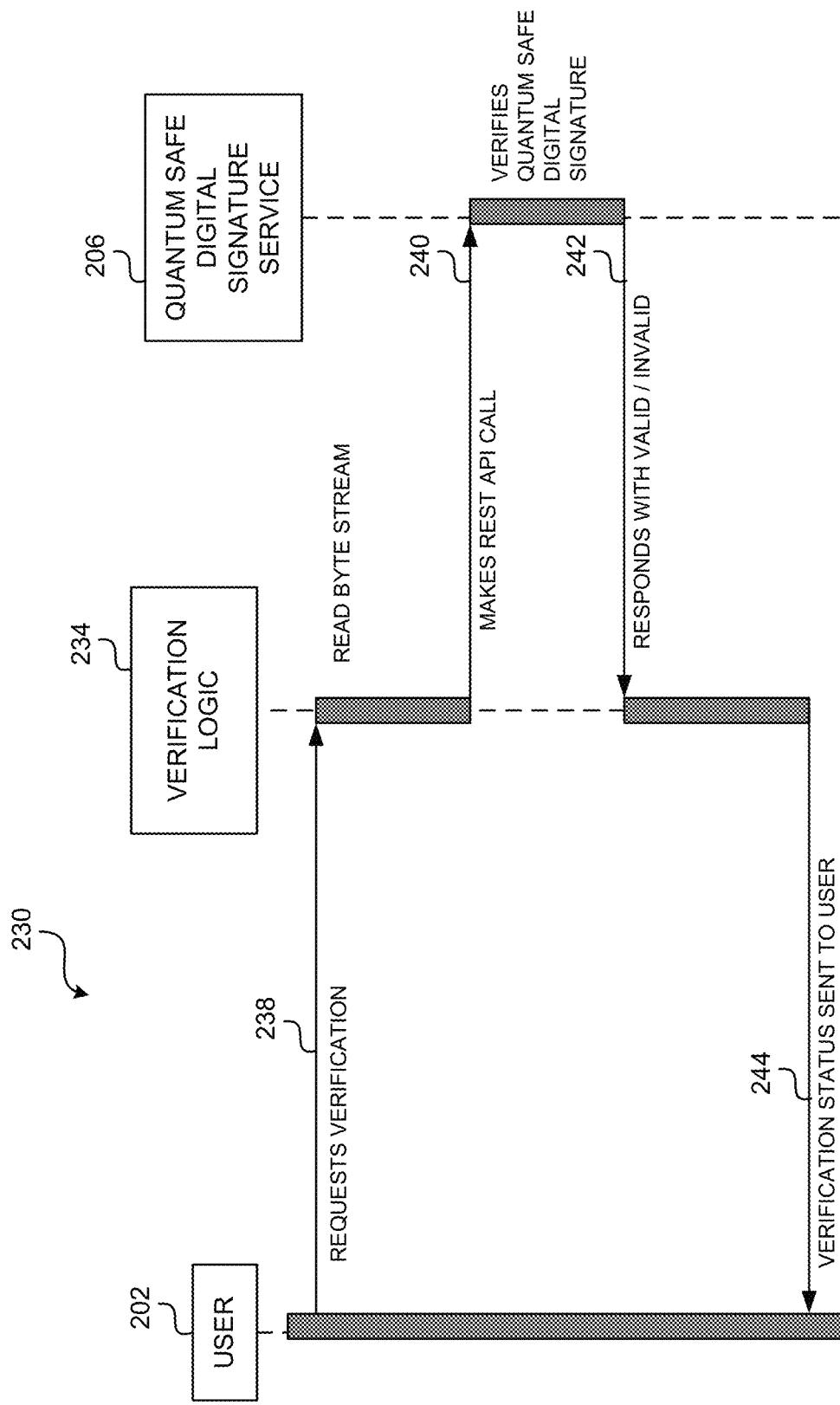

FIG. 2B is another example flow diagram 230 illustrating example processes for working with quantum-safe digital signatures consistent with the present teachings. Flow diagram 230 illustrates validation of a quantum safe digital signature. User 202 may submit a request for verification to verification logic 234 along transmission 238. This request for verification may include a digital signature as well as signed content. As used herein, signed content may be any kind of electronic content such as electronic documents in any electronic document format, such as PDF. From here, verification logic 234 reads a byte stream corresponding to the electronic content as well as the digital signature file, based on the identifier sent from user 202 and along transmission 240 sends the byte stream to quantum safe digital signature service 206. Next, quantum safe digital signature service 206 attempts to verify the quantum safe digital signature and (along transmission 242) responds with a valid or invalid indication to verification logic 234. Next, at transmission 244, the verification status is transmitted and the verification status returned to the user and/or a user device executing software in connection with the running software application.

Figure 2C:
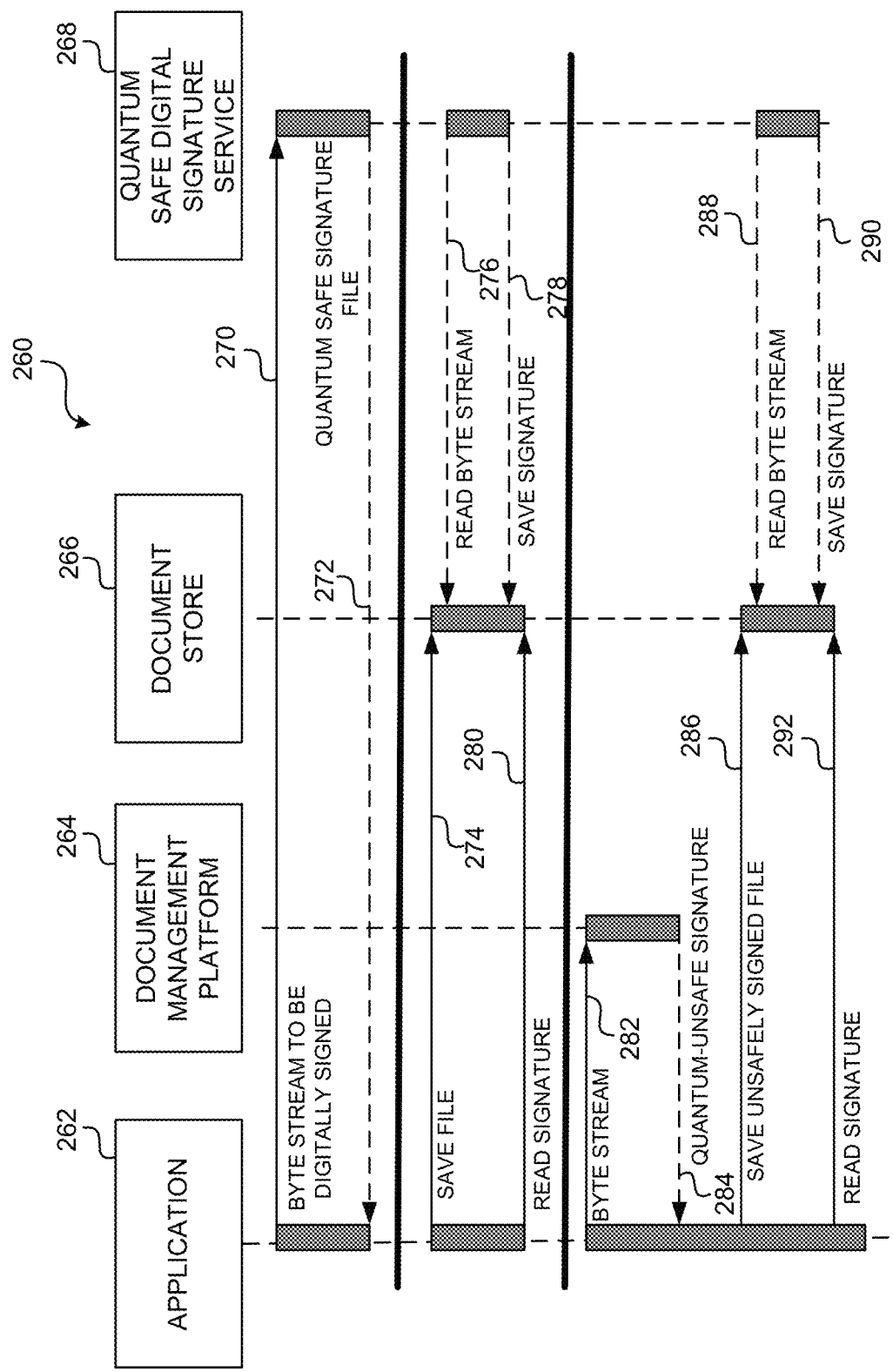

FIG. 2C is yet another example flow diagram 260 illustrating example processes for working with quantum-safe digital signatures consistent with the present teachings. Flow diagram 260 illustrates three different mechanisms for integrating application 262 with quantum-safe digital signature service 268. In a first mechanism, application 262 transmits over transmission 270 a byte stream to be digitally signed. This transmission may be sent in connection with an API call to quantum safe digital signature service 268. Similar to the mechanism described in connection with FIG. 2A, application 262 generates a byte stream corresponding to the electronic content and along transmission 270 sends the byte stream to quantum safe digital signature service 268. Next, quantum safe digital signature service 268 generates a quantum safe digital signature and (along transmission 272) responds with signed content to application 262.

In a second mechanism, application 262 saves or otherwise transmits over transmission 274 an electronic file to be digitally signed. This transmission may be sent in connection with an API call to document store 266. It is understood that application 262 may save a file in connection with 266 in many other ways. Next, quantum safe digital signature service 268 reads the electronic file from document store 266. This may be in the form of polling document store 266 for new electronic files that need to be signed. Alternatively, document store 266 may employ web hooks to notify quantum safe digital signature service 268 of the presence of a new electronic file to be signed. Once quantum safe digital signature service 268 has read a corresponding byte stream (transmission 276), quantum safe digital signature service 268 may then generate a quantum safe digital signature and over transmission 278 save an associated signature in connection with document store 266. Finally, application 262 may read the saved signature by making a request (transmission 280) from document store 266.

In a third mechanism, application 262 transmits over transmission 282 an electronic file (or corresponding byte stream) over transmission 282 to be conventionally digitally signed in connection with document management platform 264. Document management platform 264 may be any document management system or a conventional digital signature management platform such as DocuSign. Such a conventionally signed document would not have any benefits of a quantum safe digital signature and may therefore be considered quantum unsafe. At transmission 284, such an unsafely signed (using conventional digital signature techniques) signature may be transmitted back to application 262. Similar to the transaction associated with the second mechanism above, the unsafely signed document is then signed in a quantum safe manner as follows. The corresponding unsafely signed file (or corresponding byte stream) is stored in document store 266 (transmission 286). A byte stream associated with this document may be read in connection with transmission 288. Quantum safe digital signature service 268 then performs a quantum safe signature and saves the signature in connection with transmission 290. Finally, at transmission 292, application 262 may read the quantum safe signature stored in document store 266.

Figure 3:
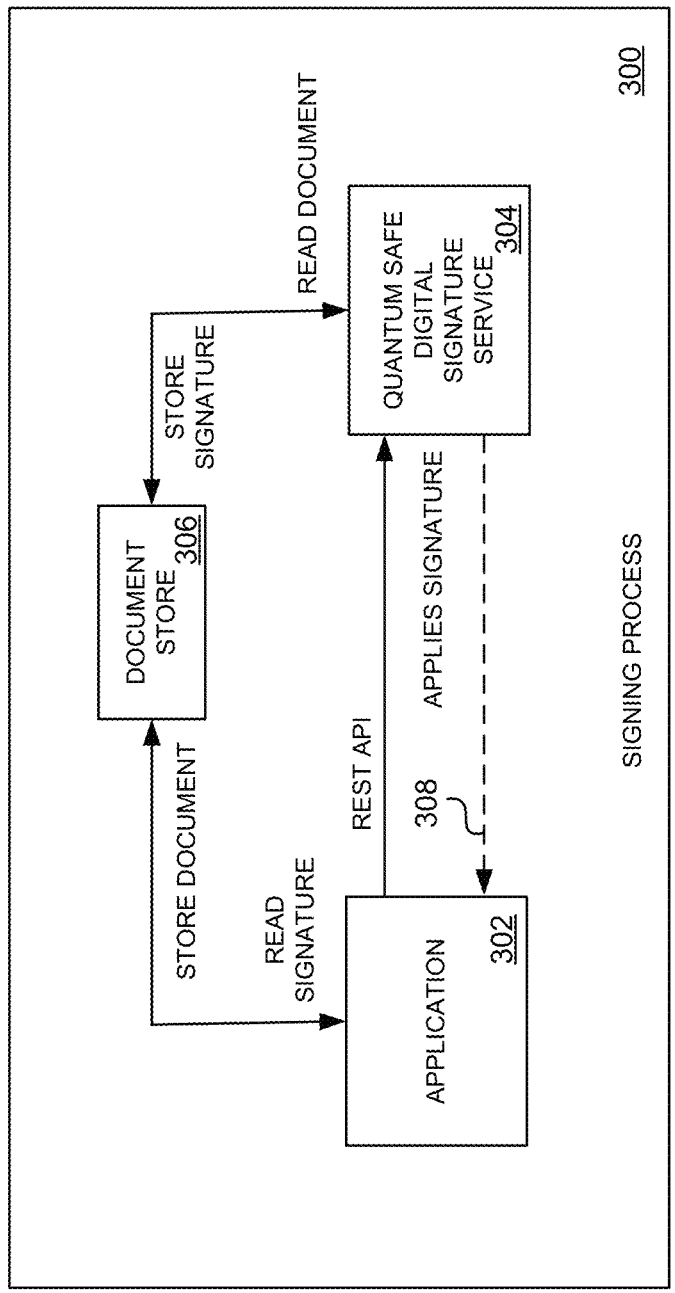
FIG. 3 shows an example system diagram illustrating providing quantum-safe digital signatures in connection with a document store consistent with the present teachings.

FIG. 3 shows an example system diagram 300 illustrating providing quantum-safe digital signatures in connection with a document store consistent with the present teachings. Application 302 transmits an API request to quantum safe digital signature service 304. In some embodiments, the API request contains contents to sign as well as an instruction to sign the content. Next, quantum safe digital signature service 304 may apply a quantum safe signature to the digital content. In connection with response 308, quantum safe digital signature service 304 transmits an instantiation of a corresponding quantum safe digital signature. In addition to a direct response containing a signature, document store 266 may be employed such that application 302 may first store documents in document store 306, and by setting an attribute associated with a stored file, for example, quantum safe digital signature service 304 may detect that a new quantum safe signature is required. Digital signature service 304 may then provide such a signature and application 302 may access the signed document from document store 306.

Figure 4:
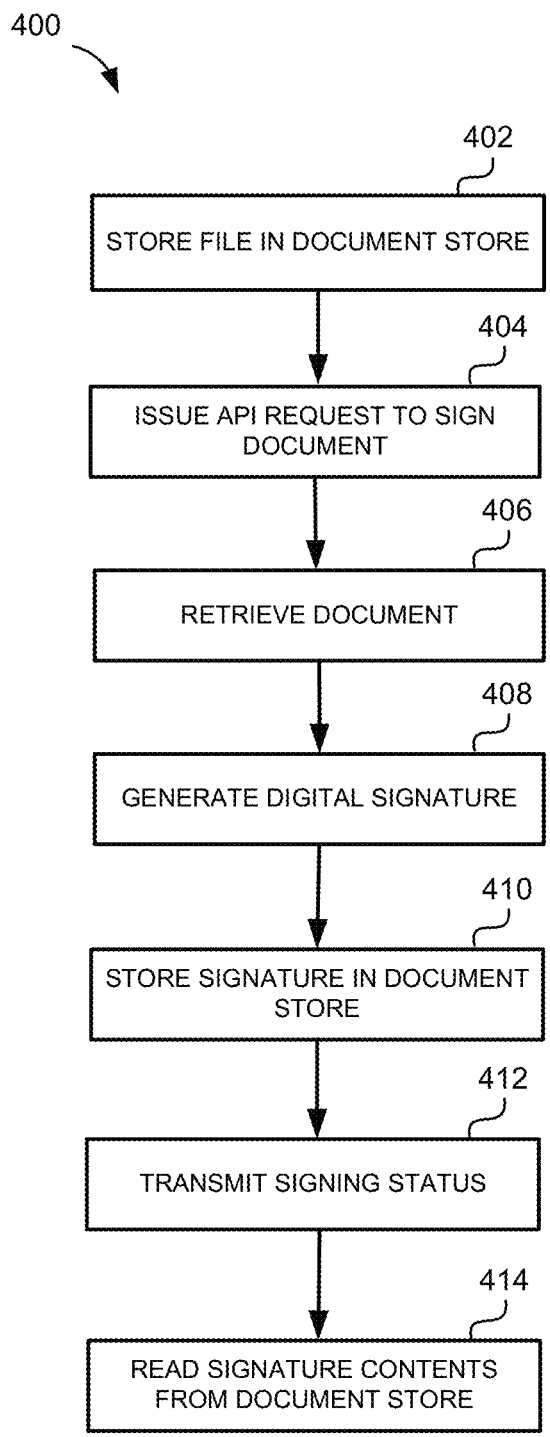
FIG. 4 is a flow diagram illustrating an example method for decoupled integration into existing software applications of generation and verification of quantum-safe digital signatures according to certain embodiments.

FIG. 4 is a flow diagram 400 illustrating an example method for decoupled integration into existing software applications of generation and verification of quantum-safe digital signatures according to certain embodiments. At step 402, the software application stores electronic document content in connection with a document store. At step 404, the software application issues an application programming interface (API) request to a quantum-safe digital signature service, wherein the API request comprises an identifier associated with the electronic document content and a request to generate a quantum-safe signature associated with the electronic document content.

At step 406 the request to generate a quantum-safe signature of the electronic document content causes the quantum-safe digital signature service to retrieve the electronic document content from the document store. At step 408, the quantum-safe digital signature service generates a quantum-safe digital signature data structure. At step 410, the quantum-safe digital signature service stores the quantum-safe digital signature data structure to the document store. At step 412, the quantum-safe digital signature service transmits a signing status update to the software application. At step 414, the software application reads the signature data structure from the document store.

In some embodiments, the API request is made directly to the quantum-safe digital signature service. In some other embodiments, the API request is made indirectly to the quantum-safe digital signature service via the document store by setting an attribute associated with the electronic document content. In some other embodiments, the electronic document content comprises an electronic file that is persisted in connection with persistent storage associated with the document store. In some other embodiments, the document store is a document management system. In some embodiments, the API request is a REST API request. In some embodiments, the signature data structure comprises an electronic file containing the quantum-safe digital signature.

Figure 5:
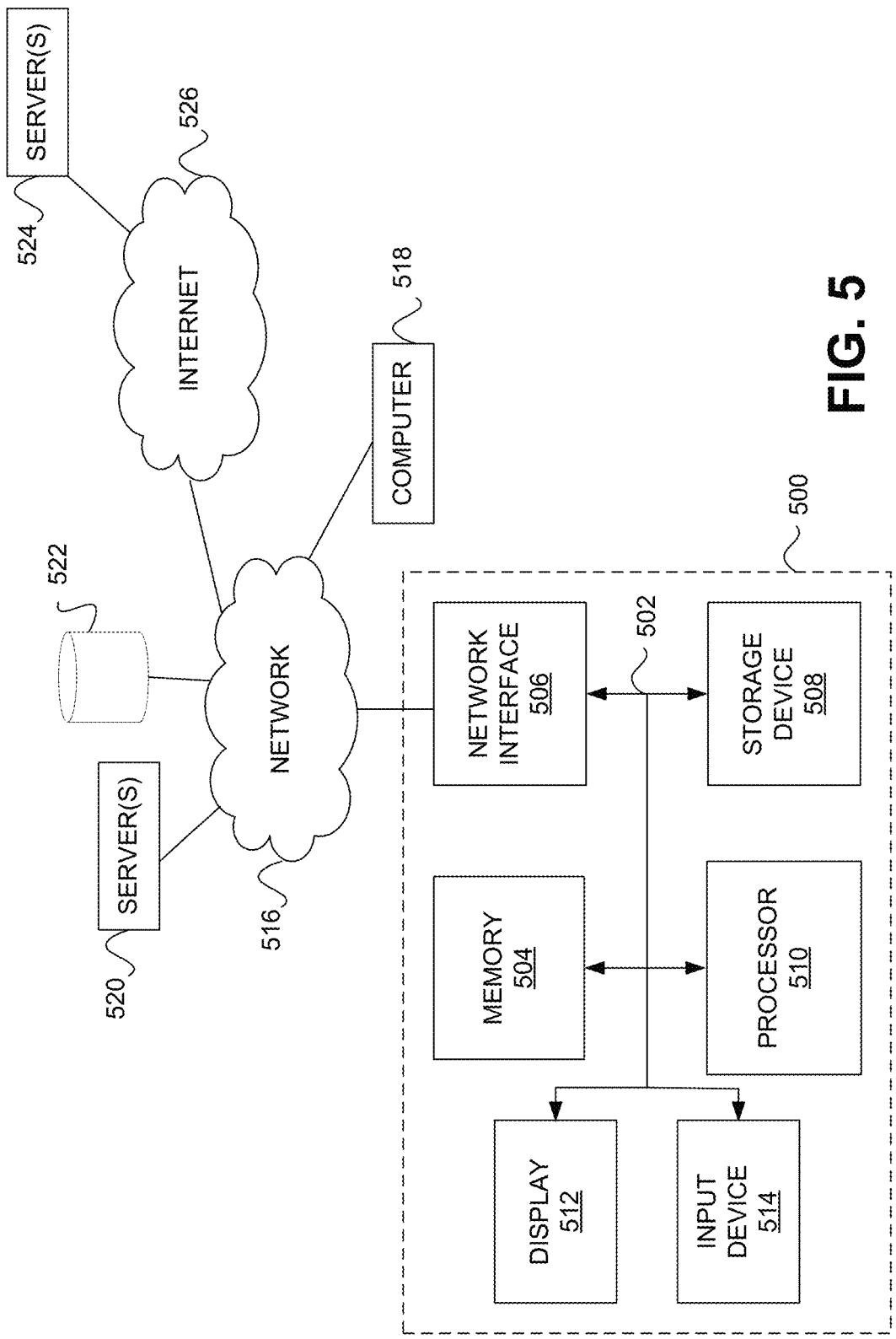
FIG. 5 is a diagram illustrating a sample computing device architecture for implementing various aspects described herein.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor that may be employed to cause actions to be carried out. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

1. One or more non-transitory computer-readable media storing computer-executable instructions that, when executed by a processor, perform a method of decoupled integration of quantum-safe digital signatures into a software application, the method comprising:
    storing, by the software application, in connection with a document store, electronic document content;
    issuing an application programming interface (API) request to a quantum-safe digital signature service,
        wherein the quantum-safe digital signature service interface with a multi-algorithm quantum-safe cryptographic library that supports multiple quantum-safe algorithms to generate a variety of quantum-safe signatures,
        wherein the API request comprises an identifier associated with the electronic document content and a request to generate a quantum-safe signature associated with the electronic document content, and
    wherein the request to generate the quantum-safe signature of the electronic document content causes the quantum-safe digital signature service to:
        retrieve the electronic document content from the document store based on the identifier;
        generate a quantum-safe digital signature data structure;
        store the quantum-safe digital signature data structure to the document store; and
        transmit a signing status update to the software application; and
    reading, by the software application, the quantum-safe digital signature data structure from the document store.

2. The non-transitory computer-readable media of claim 1, wherein the API request is made directly to the quantum-safe digital signature service.

3. The non-transitory computer-readable media of claim 1, wherein the API request is made indirectly to the quantum-safe digital signature service via the document store by setting an attribute associated with the electronic document content.

4. The non-transitory computer-readable media of claim 1, wherein the electronic document content comprises an electronic file that is persisted in connection with persistent storage associated with the document store.

5. The non-transitory computer-readable media of claim 1, wherein the document store is a document management system.

6. The non-transitory computer-readable media of claim 1, wherein the API request is a REST API request.

7. The non-transitory computer-readable media of claim 1, wherein the signature data structure comprises an electronic file containing the quantum-safe digital signature.

8. The non-transitory computer-readable media of claim 1, wherein the quantum-safe digital signature service detects an attribute associated with the electronic document content to determine that a new quantum-safe signature is required.

9. A method for decoupled integration of quantum-safe digital signatures into a software application, the method comprising:
    storing, by the software application, in connection with a document store, electronic document content;
    issuing an application programming interface (API) request to a quantum-safe digital signature service,
        wherein the quantum-safe digital signature service interface with a multi-algorithm quantum-safe cryptographic library that supports multiple quantum-safe algorithms to generate a variety of quantum-safe signatures,
        wherein the API request comprises an identifier associated with the electronic document content and a request to generate a quantum-safe signature associated with the electronic document content, and
    wherein the request to generate the quantum-safe signature of the electronic document content causes the quantum-safe digital signature service to:
        retrieve the electronic document content from the document store based on the identifier;
        generate a quantum-safe digital signature data structure;
        store the quantum-safe digital signature data structure to the document store; and
        transmit a signing status update to the software application; and
    causing the application to read the quantum-safe digital signature data structure from the document store.

10. The method of claim 9, wherein the API request is made directly to the quantum-safe digital signature service.

11. The method of claim 9, wherein the API request is made indirectly to the quantum-safe digital signature service via the document store by setting an attribute associated with the electronic document content.

12. The method of claim 9, wherein the document store is a document management system.

13. The method of claim 9, wherein the API request is a REST API request.

14. The method of claim 9, wherein the signature data structure comprises an electronic file containing the quantum-safe digital signature.

15. The method of claim 9, wherein the electronic document content comprises an electronic file that is persisted in connection with persistent storage associated with the document store.

16. A system for decoupled integration of quantum-safe digital signatures into a software application, the system comprising:
   at least one processor;
   and at least one non-transitory memory storing computer executable instructions that when executed by the at least one processor cause the system to carry out actions comprising:
   storing, by the software application, in connection with a document store, electronic document content;
   issuing an application programming interface (API) request to a quantum-safe digital signature service,
   wherein the quantum-safe digital signature service interface with a multi-algorithm quantum-safe cryptographic library that supports multiple quantum-safe algorithms to generate a variety of quantum-safe signatures,
   wherein the API request comprises an identifier associated with the electronic document content and a request to generate a quantum-safe signature associated with the electronic document content, and
   wherein the request to generate the quantum-safe signature of the electronic document content causes the quantum-safe digital signature service to:
      retrieve the electronic document content from the document store based on the identifier;
      generate a quantum-safe digital signature data structure;
      store the quantum-safe digital signature data structure to the document store; and
      transmit a signing status update to the software application; and
   causing the software application to read the quantum-safe digital signature data structure from the document store.

17. The system of claim 16, wherein the API request is made directly to the quantum-safe digital signature service.

18. The system of claim 16, wherein the API request is made indirectly to the quantum-safe digital signature service via the document store by setting an attribute associated with the electronic document content.

19. The system of claim 16, wherein the document store is a document management system.

20. The system of claim 16, wherein the API request is a REST API request.

* * * * *